Patented July 14, 1942

2,289,392

UNITED STATES PATENT OFFICE 2,289,392

POLISH

Joseph A. Tumbler, Baltimore, Md.

No Drawing. Application November 15, 1938,
Serial No. 240,537

4 Claims. (Cl. 106—9)

My invention relates to chemical compositions, and more particularly, relates to novel polishes for lacquered or enamel surfaces such as are found on automobile bodies and the like, and also relates to a novel process for making the said compositions.

On exposure to the action of the weather, all oleo-resinous, nitro-cellulose lacquer, and synthetic resin coatings or finishes deteriorate. This deterioration is more particularly due to the action of the ultra violet portions of the sun-light rays from sunshine, and to a lesser extent is also due to the action of rain, wind and its accompanying dust.

The manifestation of this deterioration is exhibited as a decrease in gloss or luster, by the appearance of "bloom" or efflorescence, and by cracking, checking or chalking of the surface layer of the finish. These surface conditions are such, that they materially alter the appearance of a finish, causing colored coatings to appear either faded or darkened, and decreasing the transparency of clear finishes.

Thus the weathered finish is pictured as having a very erose surface and discontinuous structure. Loosened surface pigment particles have left pits and mounds. Cracks have been widened and deepened, producing the appearance of a more or less weathered mud flat. The structure of the embrittled and hardened finish below the surface is cracked by temperature change and vibration so that it has interfaces of cleavage intersecting in all directions. This makes the relatively optically homogeneous or transparent material a much lighter color due to the light reflected from clearance interfaces below the surface. This lightening of color is analogous to the whiteness of snow, composed of transparent crystals.

All of the above manifestations result from oxidation or reduction. The term "oxidation" having by common usage been descriptive of the mentioned types of coating failure, it will be used in speaking of finish-failures in the following text, but always differentiating, by the use of quotation marks, from chemical oxidation, which is also referred to in the present application.

The primary function of a polish is to remove as much as is possible of the "oxidized" or weathered finish which is loosely adherent to the surface, and thereafter to impregnate and coat the surface with a material which will fill and bridge over the pits, cracks or crevices and produce a uniformly hard, dry and lustrous surface.

It is also a desirable quality of a polish, to produce a surface which is of a protective nature, in that it will serve to diminish the speed with which "oxidation" progresses.

Besides, "oxidation," which proceeds mainly at the finished surface, there are other changes which go deeper into the finish and which may be remedied. One of these is the continued polymerization of oils used in finishes. This results in brittleness and in loss of elasticity. In lacquers, the evaporation of plasticizers, e. g., dibutyl-phthalate, etc. also results in brittleness, and loss of adhesion and flexibility.

A further function of a good polish is to penetrate the substance of the dried out finish itself, restoring the properties of elasticity and resilience.

There are many liquid materials which might be applied to a weathered finish to achieve the results just described. Varnishes, solutions of synthetic or natural resins, drying or other fatty oils, or even solutions of nitrocellulose function in that way. The antiquated, acid-emulsion polish containing either varnish or linseed oil stabilized by butter of antimony produces a finish of this type. However, such materials are invariably sticky. After applying them to a surface with a cloth, a smeary finish is produced which it is practically impossible to rub dry and which holds lint from the cloth and gathers dust and dirt.

The more efficient of these materials are the resin solutions and some blown oils. These more efficient materials possess light refractive properties very similar to those of the commonly used finishes. Upon their penetrating a crack, cleavage interface or by filling a pit, they appear to unite the discontinuous substance of the finish, restoring the lustre and original color. Such materials solve the problem of restoring optical homogeneity to the finish. They can also be selected to give films which dry, either by evaporation of solvents or by air oxidation, to give hard protective films. They cannot, however, be applied simply and easily to give smooth surfaces. Painting with a brush or daubing with a cloth gives most unsatisfactory results as regards smoothness. Spraying of solutions is practised as a restorative and protective measure for finishes, but only experienced and skilled operators can secure satisfactory results by this method of application.

Heretofore it has been proposed to use an emulsion of mineral oil in which an abrasive is suspended which loosens and assists in the removal of oxidized particles, leaving a film of mineral oil on the surface. The film of mineral oil cannot become a part of the lacquered surface, and accordingly is gradually lost by volatilization and absorption in a cloth wiping over the surface.

It is essential that a good polish have a high refractive index, similar to that of the oils or resins and nitrocellulose found in the finish itself, in order to secure satisfactory depth and lustre. Otherwise scratches and pits will not be hidden and other surface irregularities will show up the surface film as being superimposed. Similarity of light refractivity of the polish and of the finish results in optical uniformity and invisibility of any dividing line between the substance of one and the other.

I have discovered that castor oil, especially air blown castor oil, which is a plasticizer for nitrocellulose lacquers and other oil and resin-containing compositions, also possesses high surface tension compared with other oils. A film of castor oil formed over the irregular surface tends to smooth itself out, reducing the interstices and other unevenesses. The smooth film thus obtained has gloss and lustre, comparable with that of new finishes.

Castor oil is a fluorescent substance and accordingly absorbs ultra-violet rays, preventing these destructive rays from reaching and injuring the lacquered surface. At the same time it is readily polymerized, becoming harder upon exposure, retaining its smooth transparent nature, becoming more resistant to ultra-violet transmission.

Castor oil decreases the water permeability of films comprised of nitrocellulose and its addition to a polish for surfaces coated with nitro-cellulose lacquers materially aids in prolonging the life of such coatings because water is particularly destructive to lacquer finishes.

I have found that I can form an improved polish by forming a condensation product of, for example, blown castor oil and certain acids, such as, for example, oleic acid, phenol or cresol, phthalic anhydride and the like. Thus I form a polish comprising a condensation product of oil and an acid which is suspended in a carrier with which it is immiscible, such as petroleum hydrocarbon, which, in turn, is dispersed in a body of water. The polishing element, which is the condensation product of the oil and the acid, is heavier bodied in consistency than, for example, blown castor oil and forms emulsions particularly suitable for polishing purposes having an affinity for more types of lacquer finishes than blown castor oil. These condensation products also seem to have greater durability upon exposure to sunlight and have, in many cases, a great polishing action on metallic surfaces coated with enamels. I may form the polish element either from the reaction of blown castor oil and these acids or from raw castor oil or certain equivalent oils which may be condensed with such acids to form suitable polishing substances.

It is an object of my invention to provide a novel polish comprising as polishing agents a condensation product of an oil and an acid.

It is another object of my invention to provide a polish comprising as polishing agents the condensation products of a castor oil and acid and blown castor oil and acid.

It is a further object of my invention to provide a polishing material comprising a condensation product of castor oil and acid suspended in a carrier with which it is immiscible, which, in turn is dispersed in water, which is immiscible with both the condensation product and the carrier.

It is a further object of my invention to provide a polishing material comprising a condensation product of castor oil and oleic acid.

It is a further object of my invention to provide a polishing material comprising a condensation product of blown castor oil and oleic acid.

It is a further object of my invention to provide a polishing material comprising a condensation product of castor oil and phenol.

It is a further object of my invention to provide a polishing material comprising a condensation product of castor oil and phthalic anhydride.

I form the polish of my invention by mixing blown castor oil and oleic acid, in such proportions that the oleic acid is from two to three times the magnitude by weight of the free fatty acid originally existing in the blown castor-oil and allowing such mixture to react at normal temperatures and pressures for a period of 24 to 48 hours, after which time has expired, it will be found that the resulting acid value of the mixture is no greater than the acid value of the original oil entering such admixture. The product formed is heavier bodied in consistency than the original blown castor oil and shows a tendency to form emulsions particularly suitable for polishing purposes, having greater affinity for certain types of lacquer finishes than ordinary pale blown castor oil.

Alternatively I may employ condensation products of castor oil and phenol or cresol formed by reacting three parts by weight of castor oil with one part by weight of phenol or cresylic acid at temperatures above 230° centigrade until complete elimination of water vapors has been accomplished, and using such condensation product as a substitute for pale blown castor oil polishing element. These condensation products have a greater durability upon exposure to sunlight than straight pale blown castor oil, and yield polishes which have particular affinity for metallic surfaces, coated with enamels, based upon phenol-formaldehyde resinous vehicles.

Further I may employ condensation products of castor oil and phthalic anhydride formed by reacting castor-oil and phthalic anhydride in the correct molecular proportions so that the molecular equivalent of the glyceryl originally present in the castor oil has been reacted with its molecular equivalent of phthalic anhydride, the reaction to be carried out at temperature in excess of 230° centrigrade but below 260° centigrade until all aqueous products of reaction are removed, the resulting condensation product to be employed as the polish element in the oil in water emulsion.

Blown castor oil can be variously obtained by blowing to give products of viscosities ranging from that of raw castor oil about 130 secs., Saybolt at 100° F., or less to gummy solids and these results can be duplicated by other treatments of castor oils than blowing to give the same physical and chemical products. Thus, although pale blown castor oil, which has a viscosity of about 400 secs., Saybolt at 100° F., and which is described as an oxidized oil, gives the best results, it is not necessary that the oil be of this particular type. Raw or heavier blown castor oils may be used to give polish films which give more or less lustre and more or less tackiness, respectively.

With respect to the specific description of the above reactions, I note the following:

1. Condensation of organic acids with blown castor oil. The process of blowing produces intermediate products some of which are acidic. These intermediate products react to form stable condensation materials, but the intermediate products are not all produced in balanced proportions to be reabsorbed by the final reaction. The final absorption of acidic materials continues for a few days after processing and blown castor oil will absorb, slowly at ordinary temperature and more rapidly at elevated temperatures, a considerable additional amount of an organic acid. Laboratory measurements have been made on the absorption of oleic acid (red oil) which have given indications that the reaction is dependent on the presence of the double bond in the acid, for stearic acid does not react in the same way. The resulting product is, however, more soluble in mineral oil than castor oil. However, the reaction suggests possibilities of producing more durable oils by substituting linseed oil acid or other drying oil acids for the oleic acid. This type of reaction has not been determined but is likely a re-esterification.

2. Condensation of raw castor oil with phthalic anhydride. This has been done in the laboratory by heating them together about six hours at temperatures between 150° C. and 200° C. The resulting material is thinner or thicker according as less or more phthalic anhydride has been used. 5% to 20% phthalic anhydride based on total mixture has been used. The resulting preparation is liquid, insoluble in mineral oils, and partly insoluble in alcohol. A definite reaction is indicated by a substantial decrease in the total acidity of the mixture. This reaction is probably a condensation but may be partly a re-esterification.

3. Condensation of castor oil with phenols and cresols. Castor oil breaks down on heating to form, among other things, heptaldehyde and undecylenic acid. The reaction does not take place appreciably at ordinary temperatures, but takes place very slowly at 150° C. and becomes active above 200° C. Phenols and cresols and other compounds of the same type, react with aldehyde to form resinous condensation products. The addition of phenol in relatively small amounts to castor oil permits the production of resins at high temperatures which give body to the oil after cooling. The resulting products are liquid, insoluble in mineral oils and give films of greater weather resistance than blown castor oil alone gives.

Pale blown castor oil may also be replaced by oils of other origin than the castor bean. Croton oil has properties closely resembling those of castor oil, and a similar constitution. It is the only other member of the "Castor oil group" or "ricinoleic acid group" of oils. Besides croton oil, linseed, rapeseed and other oils can be processed by treatment with sulphur chloride or by hydrogenation to give oils which are insoluble in mineral oils and which have great affinity for finishes.

Although I mention the specific use of pale blown castor oil in my preferred polish, it should be understood that other material of high refractive index, immiscible with the lubricant and capable of being applied in a dispersed state to form glossy films may be used. Such materials would embrace castor oil condensed with polybasic acids to form viscous, highly light refractive compounds. Other oils derived from seeds or fruits of plants in the ricinus group—such as croton oil are examples of such materials.

Other products that may be used in lieu of castor oil are synthetic materials such as resins derived from the condensation of polybasic acids and polyhydric alcohols with or without modification with fatty acids; synthetic materials derived from the condensation of phenolic bodies and aldehydes; drying and semi-drying oils polymerized by heat, or chemical means to form substantially non-tacky films when applied. Such materials would include vegetable oils treated with sulphur chloride to render them substantially insoluble in petroleum derivatives, or vegetable oils hydrogenated to reduce tackiness after preliminary polymerization.

In general the pale blown castor oil or its alternatives must satisfy the following requirements:

1. It must be immiscible in mineral oil; have a viscosity of at least 150 secs. at 100° C.; not over 1000 secs., preferably 400 to 500 secs.
2. It must have a high refractive index, comparable to that of resins, oils and nitrocellulose.
3. It must be compatible with or soluble in materials composing finishes.
4. It must be weather resistant, non-volatile, light resistant (any change due to weathering being of a constructive nature).
5. It must have high surface tension and film-forming properties—to permit leveling.
6. It must have good wetting properties and penetration—to insure maximum absorption.

There are a few liquid materials which are, like castor oil, essentially insoluble in mineral oil. These are mostly solvents, either volatile or non-volatile, without any great film forming properties and without sufficient viscosity when used alone. However, these liquids have great penetration and affinity for finishes and the non-volatile ones are solvent plasticizers for such finishes. These solvents may be used to cut the viscosity of certain resins insoluble in mineral oils, or of combination of these resins and castor oil, or of various blown castor oils so that the resulting blend has properties optimum for practical polishing. A list of such solvents is as follows:

Volatile:

1. Lactic esters, ethyl, butyl, amyl, etc.
2. Furfural and furfuryl alcohol

Non-volatile:

1. Methoxyethylphthalate
   Ethoxyethylphthalate
2. Tracetin (also possibly diacetin)
3. Glyceryl tribenzoate It will be obvious that this list may be extended.

The mineral oil can vary considerably but gives best results within certain limits. Preferably the oil of petroleum origin should have physical characteristics as below:

Gravity_____Over 32° Bé., preferably high.
Viscosity_____62–70 secs., Saybolt, at 100° F.
Color_____Less than 2.0.
Cold test_____Below 35° F.
Flash_____Above 300° F.
Unsaturates_____Below 10%.

The gravity only serves to indicate the field of origin and consequently its chemical constitution. The saturated chain compounds, paraffins, have the least solubility in castor oil, and therefore serve best as lubricants. The higher the gravity the more saturated the oil, generally speaking. Unsaturated and cyclic compounds are undesirable because of their effect to increase miscibility of castor oil and the mineral oil. For that reason petroleum oil is preferred to shale oil and Pennsylvania oils to Mid-Continent or Mexican oils. However, quite satisfactory preparations have been made using Mid-Continent oils of about 29° Bé. gravity. The viscosity, likewise, may vary considerably. A satisfactory polish may be made using miner's oil and also by using oils of 100 secs. viscosity.

The effect of the mineral spirits is to cut the viscosity of the mineral oil temporarily allowing more cleaning action until it evaporates, after which the substantially non-volatile mineral oil remains.

As appears in the formulae, a small amount of emulsifier is employed to stabilize the dispersion of the oils in water.

Gelatine and gums aid in the stabilization of the emulsion under certain rigorous conditions such as hot and freezing temperatures.

Ammonia combines readily with some of the free acids, aldehydes and lactones to form soaps and other surface active compounds to stabilize the emulsion. Triethanolamine is very similar to ammonia in its reaction and is used to replace it to give greater stability but is much more effective if fatty acids (oleic acid, etc.) are added to promote quicker reaction.

Preferably, however, the soap of caustic potash and oleic acid is employed as the emulsifier because of better stability obtained.

Thus, although the specific use of a type of soap, i. e., a compound of a basic material and a fatty acid is mentioned as a stabilizer for the emulsion, it should be understood that it would not be departing from the spirit of our invention to stabilize the dispersion with other colloiding materials such as sulphated fatty alcohols, dispersions of casein in alkali, vegetable gums or gelatine.

The orthodichlorbenzene is an efficient solvent for tar and road oil and helps to clean such materials from the finish, and to disperse them in the mineral oil, which is largely absorbed by the polishing pad.

Although the specific use of ortho-dichlor-benzene is mentioned in the preferred formula, other material of high solvent power for tar, wax or grease, which is water insoluble, but miscible with petroleum derivatives would fulfill the spirit of the invention. Such materials would embrace other halogenated hydrocarbons such as para-dichlor-benzene, tetra and/or hexa-hydro naphthalene, solvent naphtha, or pine oil, or mixtures of any of these types of materials. Oil of citronella substitute is employed for overcoming the unpleasant odor of the castor oil.

In one process for making my product, I pump all the measured water and the triethanolamine into the emulsifier or preliminary mixer. In another tank, the light red oil, solvent, orthodichlorbenzene, perfume, pale blown castor oil, and spindle oil are mixed. After mixing these, they are then pumped up into the emulsifier and emulsified with the water while flowing in.

In the product using caustic potash as emulsifying agent, the method of manufacture is reversed; that is, all of the oils are first mixed and pumped into the emulsifier and then the water containing the caustic potash is pumped into the mixer containing the oils while mixing. This is a definite improvement for stability inasmuch as it itself serves in the mixing. The oil normally is on the external phase until approximately 50% of the water has been admitted. Then automatically the phase itself inverts, placing the oil as internal phase and water as external phase. Although this formula gives a much more stable product it is improved up from a stability standpoint as well as increasing the viscosity by incorporating gums.

This is done by mixing powdered gum arabic and powdered gum tragacanth in the ratio of three-fourths arabic and one-fourth tragacanth, into the oil mixture so that they would be well dispersed and each particle separated. Because of being insoluble in the oil, when the water is pumped into this oil mixture and comes in contact with each particle of gum, instead of agglomerates of gums, the maximum dispersion of the gums almost instantly, as well as the maximum viscosity are achieved.

From the mixer, the emulsion is carried to the homogenizer where the emulsion is carried through adjustable valves in a homogenizer by pressure pumps developing pressures up to four thousand pounds per square inch, breaking up the oil globules into minute particles. This pressure is governed by the opening between the valve and the valve seat. The closer the valve is seated, the higher the pressure and theoretically the smaller the oil globule.

I have discovered that most satisfactory results both from the point of view of creaming and from economy of operation are apparent at a pressure in a homogenizer in the order of two thousand pounds per square inch, either in a single or a series of successive stages.

From the homogenizer, the polish is carried to the storage tank and thence to the filling machines.

Heretofore, in using colloid mills, I have found it next to impossible to reduce the oil globules below an average particle size of 5 mu, whereas part of the same batch of polish that had been processed through the colloid mill was then processed through the homogenizer and I found that at 2000 pounds per square inch the greater percentage of the oil globules was invisible and there were very few approaching 5 mu.

The homogenizer breaks up the particles into a cream, increasing the stability of the emulsion to such an extent that I have found that I can maintain a state of suspension of a bottle of my polish lying on the shelf undiluted for many months.

From the above, it will now be clear that my novel polish has many possible modifications without departing from the spirit of this invention.

This is a continuation in part of Patent No. 2,136,402 based on application Serial No. 738,297, filed August 3, 1934.

I claim:

1. A polish composition in the form of an oil in water emulsion comprising water as a continuous phase and a petroleum distillate as a discontinuous phase, and dispersed in the petroleum distillate a condensation product of castor oil and a phenol, the condensation product of castor oil and the phenol being insoluble in the petroleum distillate and insoluble in the water.

2. A polish composition in the form of an oil in water emulsion comprising water as a continuous phase and a petroleum distillate as a discontinuous phase, and dispersed in the petroleum distillate a condensation product of castor oil and a cresol, the condensation product of castor oil and the cresol being insoluble in the petroleum distillate and insoluble in the water.

3. A polish composition in the form of an oil in water emulsion comprising water as a continuous phase and a petroleum distillate as a discontinuous phase, and dispersed in the petroleum distillate a condensation product of castor oil and a phthalic anhydride, the condensation product of castor oil and the phthalic anhydride being insoluble in the petroleum distillate and insoluble in the water.

4. A polish composition in the form of an oil in water emulsion comprising water as a continuous phase and a petroleum distillate as a discontinuous phase, and dispersed in the petroleum distillate a condensation product of oil selected from the group consisting of castor oil and croton oil, and an acid selected from the group consisting of, phenol, cresol and phthalic anhydride, the condensation product of oil and acid being insoluble in the petroleum distillate and insoluble in the water.

JOSEPH A. TUMBLER.